3,416,914
CHLORIDE PROCESS FOR PRODUCING IRON FROM IRON ORE

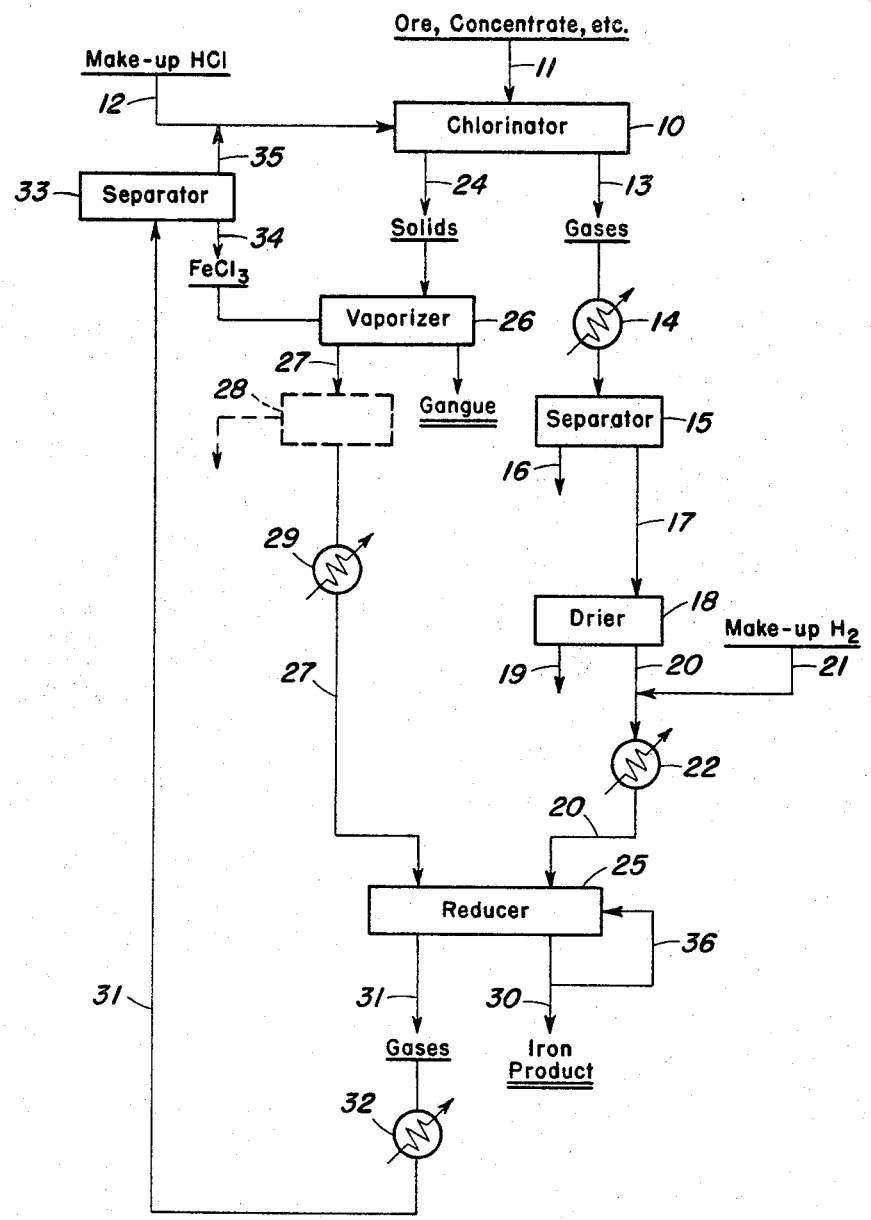

Salvatore A. Guerrieri, Rowayton, Conn., assignor to The Lummus Company, New York, N.Y., a corporation of Delaware
Filed Apr. 22, 1965, Ser. No. 450,035
8 Claims. (Cl. 75—34)

ABSTRACT OF THE DISCLOSURE

Process for treating iron ore wherein the iron ore is countercurrently contacted with a gaseous mixture of hydrogen and hydrogen chloride in a single zone to convert the ferric oxide contained therein to solid ferric chloride. The solid ferric chloride is vaporized subsequently and reduced to iron with hydrogen in a reduction zone; the gaseous mixture withdrawn from the ferric chloride production zone, after drying, providing at least a portion of the hydrogen requirements. A gaseous mixture containing hydrogen and hydrogen chloride is withdrawn from the reduction zone and employed to produce the ferric chloride.

---

The present invention relates to the treatment of iron ore, including low-grade ore, to produce iron of high purity.

The present invention is based on the use of hydrogen chloride gas to produce ferric chloride, according to the equation:

$$Fe_2O_{3(s)} + 6HCl_{(gas)} = 2FeCl_{3(s)} + 3H_2O_{(gas)} \quad (I)$$

In the process of the invention, a prepared iron ore is reacted with HCl to produce ferric chloride which is then separated from the ore and further purified, if necessary, by dephlegmation and distillation. Thereafter, the ferric chloride is reduced in the vapor phase, in a single step, to iron according to the equation:

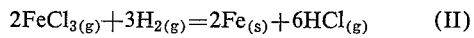

$$2FeCl_{3(g)} + 3H_{2(g)} = 2Fe_{(s)} + 6HCl_{(g)} \quad (II)$$

Reaction I is exothermic, the heat of the reaction being about 63,000 B.t.u. at 77° F., whereas reaction II is endothermic, the heat of the reaction being about 108,000 B.t.u. at 77° F. Thus reaction I requires the removal of heat whereas reaction II requires the addition of heat in order to maintain a constant reaction temperature.

The calculated free energy change for the process represented by Equations I and II changes rapidly with temperature as is evident from the following table.

| Temp., °K | 300 | 500 | 750 | 1,000 |
|---|---|---|---|---|
| ΔF., kcal./gm. mol: | | | | |
| Reaction I | −24 | −3 | +9 | +15 |
| Reaction II | +30 | +12 | −6 | −18 |

The tendency of the reaction to proceed to the right decreases rapidly with temperature for the reaction of Equation I, whereas the reverse is true for the reaction of Equation II. The free energy change is zero at about 540° K. for the reaction of Equation I, and is zero at about 660° K. for reaction of Equaiton II. Hence, the chlorination of Equation I should preferably be operated at temperatures under about 540° K. (267° C.) although the use of excess hydrochloric acid gas together with more complete removal of reaction water at higher temperatures permits operation at a somewhat higher temperature. On the other hand, unless the reaction rate is considerably increased by operation at higher temperature, there is not a significant advantage therein to compensate for the disadvantage of more serious corrosion problems, carry-over of FeCl₃ in the vapor from the chlorinator, higher heat requirements and the like. Obviously, there is an optimum set of conditions which can be established for any particular case by an economic balance.

In the case of the reduction according to Equation II, the free energy change of the reaction is zero at about 660° K. (387° C.), and hence this reaction should be conducted at above this temperature. The use of excess hydrogen permits operation at a somewhat lower temperature, but generally it is more economical to raise the reaction temperature to minimize the use of excess hydrogen, because excess hydrogen increases the size of all equipment, increasing both investment and operating costs. Hence, it is preferable to operate the reducer at as high a temperature as is economically possible above 660° K.

The reactions of Equations I and II, the heats of the reactions and the free energy-temperature relationships discussed hereinafter are basic to the process of the present invention. Of course, under different conditions (pressure, etc.) the ΔF=0 temperature changes, so 480° C. may be considered a practical maximum for chlorination and 340° C. a minimum for reduction.

The conversion of a metal oxide to a chloride and then the reduction of the chloride to the metal has been attempted heretofore. However, such a process has not been economically applied to ferriferous ores. Reeve et al., U.S. Patent 2,723,912, relates to a similar process for the treatment of low grade iron ores, but there are important technological differences between the process of Reeve et al. and the present invention. Reeve et al. disclose a two-step chlorination process with one step carried out at approximately the same temperature as in the present invention followed by a second step at a higher temperature. Furthermore, the manner of separating the chloride from the residue and purifying the same is substantially different in the present invention, and these differences result in a simpler, more economical plant, and, in a final product for the present invention containing less contaminants. Additionally, Reeve et al. reduce the chloride in solid phase in two steps. First to the bichloride and then to iron, whereas the present invention employs a single step in the vapor phase. These three differences obviously lead to differences in intermediate processing steps.

On the other hand, there are obvious similarities; for example, the preparation of the iron ore must be generally the same for both processes, because it is necessary that the iron be in the trivalent state. Recovery and recirculation of hydrogen chloride is to be accomplished in both proccesses as an economic factor to hold down processing costs. The same is true of hydrogen. The recovery and recirculation of such gases is, however, a conventional economic expedient.

It is therefore an object of the present invention to provide a novel process for the treatment of iron ore, including low grade ore, for the production of iron.

Another object of the present invention is to provide an improved process for the treatment of iron ore with hydrogen chloride to produce ferric chloride in an improved manner.

Still another object of the present invention is to provide an improved single stage process for treating iron oxide with hydrogen chloride gas to yield ferric chloride, and thereafter treating the ferric chloride in a reduction process to produce iron in a single stage.

Yet another object of the invention is to provide an improved process for producing high purity iron which is useful and economic in the production of steel, powder, metallurgical products and the like.

Other objects of the present invention will become apparent from the following detailed description of an embodiment thereof, and the novel features will be particularly pointed out in connection with the appended claims. Reference will also be made to the accompanying drawing, which is a simplified schematic flow sheet or flow diagram illustrating an embodiment of the invention.

Ore for use in the invention is preferably beneficiated by any of the well known procedures, although this is not an absolute requirement of the process. Ideally, beneficiation should provide a concentrate having near the theoretical maximum content of iron (about 70%, with iron present as $Fe_2O_3$). The process is operable, however, on ores containing as little as 30% iron. For maximum efficiency and economy, conversion of all iron to the trivalent ($Fe_2O_3$) state is desirable.

The prepared ore may be preheated to reaction temperature in a preheater (not shown) and introduced into the chlorinator 10 through line 11. The chlorinator is preferably operated at temperatures below approximately 267° C., preferably within the temperature range in which the free energy change for reaction I is negative. A temperature of approximately 194° C. is satisfactory and means (not shown) are provided for maintaining this temperature. The selected temperature must result in an economic balance between conversion, reaction rate and ferric chloride loss in the gases from the reactor. If desired, the ore preheater may be eliminated and all the necessary heat supplied in the chlorinator, but a preferred way to operate is to preheat the ore sufficiently so that the sensible heat in the ore supplies all the heat required to maintain the chlorinator 10 at the desired temperature, indicated as preferably 194° C., but not limited thereto.

For best results, the ore introduced into the chlorinator should be finely comminuted to at least −10 mesh and preferably 90% −200 mesh, to provide a large reaction surface and short reaction time. The chlorination may be performed in any standard gas-solids contactor, but for the process, it is preferred to disperse the pulverized ore into the top of an externally heated vertical cylindrical vessel so that the particles of ore will drop countercurrent to a rising stream of HCl. Another suitable reactor would be a rotary kiln.

At about 194° C., and substantially atmospheric pressure, the ferric chloride content of the gases and vapors from the chlorinator 10 is only about 1%. These effluent gases, comprising excess hydrochloric acid introduced through line 12, recycle hydrogen, water vapor and various amounts of volatile chlorides which may have been formed from impurities in the ore, are removed from the chlorinator 10 through line 13. The gases in line 13 are cooled in heat exchanger 14 and passed into a separator 15 to remove the metal chlorides, leaving most of the hydrogen chloride and water in the vapor phase. The aqueous solution from separator 15 may be further treated via line 16 to recover any iron chloride contained therein, which may then be recycled to the chlorinater. Gaseous hydrogen chloride, hydrogen and water vapor flow to a dryer 18 through line 17 wherein the water is removed through line 19 and the hydrogen chloride gas and hydrogen are passed into line 20. The hydrogen stream may be dried by the use of adsorbents or absorbents, by dephlegmation, or by a combination of these methods. Hydrogen and excess hydrogen chloride from the dryer are combined with make-up hydrogen introduced through line 21, heated in heat exchanger 22, and passed into the reducer 25, discussed hereinbelow.

To follow the flow of the solids, attention is returned to the chlorinator. The solids in the chlorinator, mostly ferric chloride, are passed to a vaporizer 26 via line 24, and the temperature of the solids is raised therein to approximately 320° C., or higher. At this temperature, ferric chloride is driven off as a vapor through line 27 together with such other volatile metal chlorides as may be present, although normally no substantial amount of chlorides of other metals should be present. Depending upon the purity of the ferric chloride vapor and the purity desired in the iron product, the ferric chloride may or may not be purified before reduction. A purifier 28, which is illustrated in dotted lines, may be used if desired. Purification may be conveniently accomplished by distillation and/or partial condensation to obtain as pure ferric chloride as may be desired.

Ferric chloride vapors from the vaporizer 26 are further heated in heat exchanger 29 to the temperature of the reduction reaction, which is preferably above 387° C., and passed into the reducer 25. The ferric chloride vapors react with hydrogen in the reducer 20 in accordance with the reaction of Equation II hereinabove. Iron is formed in the reducer 25 and removed through line 30. As the iron is in the form of a finely divided powder, care must be exercised to protect it from the atmosphere, as such powder is highly pyrophoric. Particle size is increased if a portion of the iron in line 30 is recycled to reducer 25, via line 36, so as to provide nucleation sites for the iron.

The unreacted gases are returned through line 31 to the chlorinator 10 since they are mostly hydrochloric acid gas and recycle hydrogen, together with unreacted vaporous ferric chloride. To avoid returning ferric chloride to the chlorinator 10, gases in line 31 may be cooled in heat exchanger 32 and passed into a separator 33 to knock down unreduced ferric chloride. The ferric chloride thus condensed is removed through line 34 and passed to the ferric chloride vaporizer 26. The hydrogen and hydrogen chloride gas stream removed through line 35 are then combined with the hydrogen chloride make up feed in line 12 for passage into the chlorinator 10.

The equipment utilized for the various components of the present invention may be conventional. The chlorinator, for example, is preferably a countercurrent operation employing a moving bed or cacade of solids, for example, and may employ a conventional structure such as a rotary kiln-type of apparatus. The coolers, heat exchangers, separators and dryers may also be of conventional construction.

However, it should be understood that the steps and structures cited in the description of the process of this invention are presented solely to explain the process. For example, the steps of preheating the ore, chlorinating it, vaporizing the chloride and separating the chloride from gangue can all be conveniently combined into a single apparatus. Other variations are readily apparent to those skilled in the art.

Thus, it will be understood that various changes in the details, materials, steps and arrangements of parts, which have herein been described and illustrated in order to explain the nature of the invention, may be made by those skilled in the art within the principle and scope of the invention as expressed in the appended claims.

What is claimed is:
1. A process for producing iron from iron ores, concentrates and the like containing ferric oxide comprising:
 countercurrently contacting said iron ore with a mixture of hydrogen and an excess of hydrogen chloride gas in a single chlorination zone at a temperature under approximately 480° C., to convert the ferric oxide to solid ferric chloride and water vapor;
 separating a gaseous stream comprising said water vapor, the excess hydrogen chloride gas, other gaseous reaction products and hydrogen from said solid ferric chloride;
 removing said solid ferric chloride from said chlorination zone;
 vaporizing said ferric chloride;
 drying said excess hydrogen chloride gas and the hydrogen contained in said gaseous stream;
 introducing the vaporized ferric chloride and the dried gaseous stream into a reduction zone;
 reacting said ferric chloride vapor with an excess of hydrogen gas in the reduction zone at a temperature above approximately 340° C. to reduce the ferric chloride and produce iron and hydrogen chloride, at least a portion of said hydrogen being supplied by said dried gaseous stream;

recycling the hydrogen chloride gas and excess hydrogen from said reduction zone to said chlorination zone; and removing said iron as a product.

2. A process as defined in claim 1, wherein said chlorination is carried out at a temperature of approximately 194° C. and said reduction is carried out at a temperature of approximately 400° C.

3. A process as defined in claim 1, wherein said vaporization is carried out at a temperature of approximately 320° C.

4. A process as defined in claim 3, wherein said vaporized ferric chloride is purified and preheated to approximately 350° C. prior to the reduction thereof.

5. A process as defined in claim 1, and additionally comprising adding make-up hydrogen chloride gas to said chlorination zone as required.

6. A process as defined in claim 1, wherein said ore is crushed to at least about 90 percent minus 10 mesh prior to reaction with said hydrogen chloride gas.

7. A process as defined in claim 1, and additionally comprising recycling a portion of said iron product to said reduction zone to provide nucleation sites for additional iron therein.

8. A process as defined in claim 1, wherein said hydrogen and hydrogen chloride gas stream is preheated to approximately 350° C. before passage into the reduction zone.

References Cited

UNITED STATES PATENTS

| | | | |
|---|---|---|---|
| 2,701,761 | 2/1955 | Crowley | 75—34 |
| 2,723,902 | 11/1955 | Reeve et al. | 75—34 X |
| 2,723,912 | 11/1955 | Reeve | 75—34 X |
| 2,762,700 | 9/1956 | Brooks | 75—34 X |
| 2,807,536 | 9/1957 | O'Malley | 75—26 X |
| 2,843,472 | 7/1958 | Eberhardt | 75—26 X |
| 3,295,956 | 1/1967 | Whaley | 75—26 |

FOREIGN PATENTS 939,671 10/1963 Great Britain.

Mellor, Comp. Treatise on Inorganic Theoretical Chemistry; vol. 14, 1935, pages 70, 71.

L. DEWAYNE RUTLEDGE, *Primary Examiner*.

H. W. TARRING, *Assistant Examiner*.

U.S. Cl. X.R.

75—35, 113